(12) United States Patent
Bentley et al.

(10) Patent No.: US 8,646,039 B2
(45) Date of Patent: Feb. 4, 2014

(54) AUTOMATED PEER AUTHENTICATION (75) Inventors: Jon Louis Bentley, New Providence, NJ (US); Anjur Sundaresan Krishnakumar, Rocky Hill, NJ (US); David Mandel Weiss, Long Valley, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1329 days.

(21) Appl. No.: 11/832,574

(22) Filed: Aug. 1, 2007

(65) Prior Publication Data
US 2009/0037985 A1  Feb. 5, 2009

(51) Int. Cl.
*G06F 7/00* (2006.01)

(52) U.S. Cl.
USPC .......... 726/3; 726/21; 713/155; 713/168; 713/171; 713/175; 709/227; 705/64

(58) Field of Classification Search
USPC ............ 726/5, 3, 21; 713/155, 168, 171, 175; 709/227; 705/64
See application file for complete search history.

(56) References Cited

U.S. PATENT DOCUMENTS

| | | | |
|---|---|---|---|
| 5,303,285 A | 4/1994 | Kerihuel et al. | |
| 5,848,156 A | 12/1998 | Murakami | |
| 6,014,085 A | 1/2000 | Patel | |
| 6,253,202 B1 * | 6/2001 | Gilmour | 1/1 |
| 6,282,183 B1 * | 8/2001 | Harris et al. | 370/338 |
| 6,298,072 B1 | 10/2001 | Koliczew | |
| 6,349,206 B1 | 2/2002 | Reichelt et al. | |
| 6,484,033 B2 | 11/2002 | Murray | |
| 6,788,772 B2 * | 9/2004 | Barak et al. | 379/130 |
| 6,859,651 B2 | 2/2005 | Gabor | |
| 6,983,278 B1 * | 1/2006 | Yu et al. | 1/1 |
| 7,092,508 B2 | 8/2006 | Brown et al. | |
| 7,139,390 B2 | 11/2006 | Brown et al. | |
| 7,162,256 B2 | 1/2007 | Seligmann et al. | |
| 7,181,620 B1 | 2/2007 | Hur | |
| 7,221,949 B2 | 5/2007 | Clough | |
| 7,233,997 B1 | 6/2007 | Leveridge et al. | |
| 7,237,024 B2 | 6/2007 | Toomey | |

(Continued)

FOREIGN PATENT DOCUMENTS

| | | |
|---|---|---|
| JP | 2006092530 A | 4/2004 |
| WO | WO 02085019 A1 | 10/2002 |
| WO | WO 2007012831 A1 | 2/2007 |

OTHER PUBLICATIONS

Maurice, Russell, "GB Application No. GB081291.1 Search Report", Jan. 27, 2009, Published in: IPO.

(Continued)

*Primary Examiner* — Beemnet Dada
*Assistant Examiner* — Sayed Beheshti Shirazi
(74) *Attorney, Agent, or Firm* — Kacvinsky Daisak PLLC; John Maldjian, Esq.; Alexander D. Walter, Esq.

(57) ABSTRACT

An apparatus and methods are disclosed for performing peer authentication without the assistance of a human "guard." In accordance with the illustrative embodiments, a peer is selected from a non-empty set of candidates at authentication time based on one or more of the following dynamic properties: the current geo-location of the user to be authenticated; the current geo-locations of the candidates; the current time; the contents of one or more directories (e.g., a telephone directory, an organizational chart or directory, etc.), the contents of one or more call logs; and the candidates' schedules.

20 Claims, 5 Drawing Sheets

(56) References Cited

U.S. PATENT DOCUMENTS

| | | |
|---|---|---|
| 7,246,236 B2 | 7/2007 | Stirbu |
| 7,263,179 B2 | 8/2007 | Sammon et al. |
| 7,293,284 B1 | 11/2007 | Bartram et al. |
| 7,320,143 B2 | 1/2008 | Le Pennec et al. |
| 7,334,013 B1 | 2/2008 | Calinov et al. |
| 7,392,048 B2 | 6/2008 | Seligmann et al. |
| 7,392,375 B2 | 6/2008 | Bartram et al. |
| 7,418,252 B2 | 8/2008 | Erskine et al. |
| 7,421,072 B2 | 9/2008 | Brotman et al. |
| 7,545,942 B2 | 6/2009 | Cohen et al. |
| 7,627,529 B1 | 12/2009 | Bauer et al. |
| 7,688,344 B2 | 3/2010 | Kimber et al. |
| 7,707,293 B2 | 4/2010 | Zhang |
| 7,720,208 B1 | 5/2010 | Kia et al. |
| 7,721,093 B2 * | 5/2010 | Sundararajan ............... 713/168 |
| 7,734,912 B2 | 6/2010 | Ganesan et al. |
| 7,808,906 B2 | 10/2010 | Rao et al. |
| 2001/0016038 A1 | 8/2001 | Sammon et al. |
| 2002/0133716 A1 | 9/2002 | Harif |
| 2002/0147019 A1 | 10/2002 | Uhlik et al. |
| 2003/0108186 A1 | 6/2003 | Brown et al. |
| 2003/0118167 A1 | 6/2003 | Sammon et al. |
| 2003/0119506 A1 | 6/2003 | Singhai et al. |
| 2003/0156707 A1 | 8/2003 | Brown et al. |
| 2004/0035644 A1 * | 2/2004 | Ford et al. ..................... 186/41 |
| 2004/0054885 A1 | 3/2004 | Bartram et al. |
| 2004/0098588 A1 | 5/2004 | Ohba et al. |
| 2004/0122958 A1 * | 6/2004 | Wardrop ....................... 709/229 |
| 2004/0153518 A1 | 8/2004 | Seligmann et al. |
| 2004/0179660 A1 | 9/2004 | Sammon et al. |
| 2004/0189441 A1 * | 9/2004 | Stergiou ...................... 340/5.51 |
| 2004/0202306 A1 | 10/2004 | Brotman et al. |
| 2004/0214558 A1 * | 10/2004 | Chang et al. ................. 455/416 |
| 2004/0216039 A1 | 10/2004 | Lane et al. |
| 2004/0218744 A1 * | 11/2004 | Nguyen et al. .......... 379/202.01 |
| 2004/0236771 A1 * | 11/2004 | Colver et al. ................. 707/100 |
| 2005/0070312 A1 | 3/2005 | Seligmann et al. |
| 2005/0091172 A1 * | 4/2005 | King et al. ..................... 705/64 |
| 2005/0135305 A1 * | 6/2005 | Wentink ....................... 370/329 |
| 2005/0250482 A1 | 11/2005 | Seligmann et al. |
| 2006/0004921 A1 * | 1/2006 | Suess et al. .................. 709/227 |
| 2006/0014532 A1 | 1/2006 | Seligmann et al. |
| 2006/0030263 A1 | 2/2006 | Seligmann et al. |
| 2006/0095771 A1 * | 5/2006 | Appenzeller et al. ......... 713/171 |
| 2006/0178567 A1 * | 8/2006 | Goh et al. ..................... 600/300 |
| 2006/0224477 A1 * | 10/2006 | Garcia et al. ................... 705/32 |
| 2006/0256008 A1 * | 11/2006 | Rosenberg .................... 342/367 |
| 2007/0033397 A1 * | 2/2007 | Phillips, II et al. .......... 713/168 |
| 2007/0061881 A1 * | 3/2007 | Eyre ............................... 726/21 |
| 2007/0071180 A1 | 3/2007 | Kanada |
| 2007/0094497 A1 | 4/2007 | O'Gorman et al. |
| 2007/0112964 A1 | 5/2007 | Guedalia et al. |
| 2007/0118735 A1 * | 5/2007 | Cherrington et al. ......... 713/155 |
| 2007/0162554 A1 | 7/2007 | Branda et al. |
| 2007/0171910 A1 | 7/2007 | Kumar |
| 2007/0214259 A1 * | 9/2007 | Ahmed et al. ................ 709/224 |
| 2007/0230683 A1 | 10/2007 | Brown et al. |
| 2007/0265956 A1 * | 11/2007 | Epstein et al. .................. 705/37 |
| 2007/0283027 A1 * | 12/2007 | Hoffmann .................... 709/229 |
| 2008/0005095 A1 * | 1/2008 | Horvitz et al. .................. 707/5 |
| 2008/0010200 A1 * | 1/2008 | Smith et al. .................... 705/41 |
| 2008/0071761 A1 * | 3/2008 | Singh et al. ..................... 707/5 |
| 2008/0077976 A1 * | 3/2008 | Schulz ............................ 726/5 |
| 2008/0102766 A1 * | 5/2008 | Schultz ......................... 455/110 |
| 2008/0102790 A1 * | 5/2008 | Schultz ......................... 455/410 |
| 2008/0120718 A1 | 5/2008 | Bentley et al. |
| 2008/0126541 A1 * | 5/2008 | Rosenberg et al. ........... 709/225 |
| 2008/0141034 A1 | 6/2008 | Bartram et al. |
| 2008/0146193 A1 | 6/2008 | Bentley et al. |
| 2008/0152113 A1 * | 6/2008 | Chang et al. ............. 379/202.01 |
| 2008/0195861 A1 | 8/2008 | Salomone |
| 2008/0235043 A1 * | 9/2008 | Goulandris et al. ............. 705/1 |
| 2008/0294655 A1 * | 11/2008 | Picault et al. ................. 707/100 |
| 2009/0037985 A1 | 2/2009 | Bentley et al. |
| 2009/0125435 A1 | 5/2009 | Cohen et al. |
| 2009/0125721 A1 * | 5/2009 | Numaoka ..................... 713/175 |
| 2009/0131015 A1 | 5/2009 | Bentley et al. |
| 2009/0133106 A1 | 5/2009 | Bentley et al. |
| 2009/0133117 A1 | 5/2009 | Bentley et al. |
| 2009/0193514 A1 | 7/2009 | Adams et al. |

OTHER PUBLICATIONS

J. Brainard, A. Juels, R. Rivest, M. Szydlo, and M. Yung. Fourth Factor Authentication: Somebody You Know. Association of Computing Machinery Conference on Computer and Communications Security, Oct. 30-Nov. 3, 2006, pp. 168-178, Alexandria, VA, USA.
Avaya Inc., JP Patent Application No. 2008-194375, Office Action dated Sep. 28, 2012, 2 pages.

* cited by examiner

AUTOMATED PEER AUTHENTICATION

FIELD OF THE INVENTION

The present invention relates to security in general, and, more particularly, to peer authentication.

BACKGROUND OF THE INVENTION

Peer authentication is a method by which a first user is authenticated by a second user. (Note that, as in the term peer-to-peer communication, the word "peer" is used generically and has no connotation regarding the professional or social standing of the users.) An example of peer authentication is illustrated by the following familiar scenario: an employee in the lobby of a corporate building realizes that she accidentally left her corporate badge at home, and that therefore she will not be allowed to enter the building proper without some other means of authentication. She therefore approaches the guard in the lobby and tells the guard that she is an employee, but that she doesn't have her badge.

The guard then:
  asks the employee for her name;
  looks up the name in a computer database;
  notes the employee's office number;
  submits a query to the database to determine who the employee's officemate is; and
  calls the officemate, asking him to come to the lobby to ID the alleged employee.
The officemate arrives at the lobby, and then either:
  verifies that the alleged employee is indeed an employee of the company, or
  tells the guard that he does not recognize the alleged employee.
In the former case, the guard permits both employees to advance past the lobby, while in the latter case, the guard stops the alleged employee from advancing past the lobby, and perhaps takes some additional action (e.g., calls the police, etc.).

In a variation of the above scenario, the guard, rather than asking the officemate to come to the lobby, might ask the officemate to talk to the alleged employee over the phone. The officemate talks to the alleged employee over the phone, and determines whether the alleged employee is in fact who she claims to be, based on the telephone conversation (e.g., based on her voice, based on her answers to one or more questions, etc.). The officemate then informs the guard whether the alleged employee should be allowed to advance past the lobby.

SUMMARY OF THE INVENTION

The present invention enables peer authentication to be conducted in an automated fashion, without the assistance of a human "guard" to perform the following tasks:
  selecting a peer,
  asking the peer to authenticate a user, and
  denying/granting access to a particular resource or function based on the peer's "verdict".
Furthermore, in accordance with the illustrative embodiments of the present invention, a data-processing system (e.g., a server, a desktop computer, etc.) selects a peer dynamically at authentication time, rather than in an a priori fashion, as in the prior art. In particular, a peer is selected from a non-empty set of candidates based on one or more of the following dynamic properties:
  the current geo-location of the user U to be authenticated,
  the current geo-locations of the candidates,
  the current time,
  the contents of one or more directories (e.g., a telephone directory, an organizational directory, etc.),
  the contents of one or more call logs, and
  the candidates' schedules.

For example, the data-processing system might be programmed to select the candidate that is physically closest to user U, or to select the physically-closest candidate who is not currently at a meeting (as indicated by the current day/time and the candidates' schedules). As another example, the data-processing system might be programmed to consult one or more directories and select someone who is in the same department as user U (e.g., the department chairman, a direct report to user U, a department member having the same professional rank as user U, etc.). As yet another example, the data-processing system might infer which candidate knows user U best based on one or more call logs (e.g., based on the number of calls between each candidate and user U, the durations of these calls, etc.), and select that candidate as the peer (the theory being that the candidate who knows user U best would be the best peer to authenticate user U.)

In the first illustrative embodiment of the present invention, an input device (e.g., a numeric keypad, a magnetic card reader, etc.) controls access to an electronically-locked door, and an individual who wishes to enter through the door supplies a user identifier U (e.g., an employee number, an office telephone number, etc.) to the device accordingly (e.g., by keying in identifier U, by swiping a magnetic card on which identifier U is stored, etc.). The input device then transmits identifier U to a data-processing system, and in response the data-processing system selects a peer based on one or more properties of one or more entities, as described above. The data-processing system subsequently transmits a message (e.g., a telephone call, an instant message [IM], etc.) to the selected peer that indicates that an individual claiming to be user U is at the electronically-locked door, waiting to be allowed entry. The peer then authenticates the individual and, if appropriate, allows the individual to enter through the door. In some embodiments, the peer might perform the authentication in person and allow the individual to enter by physically unlocking the door, while in some other embodiments, the peer might perform the authentication remotely via an intercom and video camera and allow the individual to enter by "buzzing him or her in." In the case that the selected peer does not respond to the transmitted message within a chosen timeout period (e.g., 30 seconds, etc.), then the data-processing system selects another peer to perform the authentication.

In accordance with the second illustrative embodiment of the present invention, when a wireless terminal user attempts to perform some function that requires authentication, the terminal transmits a message to a data-processing system that indicates that the terminal's current user needs to be peer-authenticated. In response, the data-processing system selects a peer based on one or more properties of one or more entities, as described above, and transmits a message to the selected peer that indicates that the peer should verify whether the terminal's current user is in fact who it should be (i.e., the user to which the terminal is registered). The peer then authenticates the current user of the terminal (e.g., in person via visual inspection, in person via a conversation, remotely by visual inspection, remotely via a conversation, etc.) and transmits the result to the data-processing system. The data-processing system forwards the result to the terminal, and the terminal either grants or denies access to its current user accordingly. As in the first illustrative embodiment, if the selected peer does not respond to the transmitted message within a timeout period, then the data-processing system selects another peer to perform the authentication.

The illustrative embodiments comprise: a receiver for receiving a signal that indicates that a user is to be authenticated; and a processor for selecting a peer to authenticate the user; wherein the selection of the peer is based one or more properties of one or more entities; and wherein at least one of the properties is expected to change during any time interval of N minutes; and wherein N is a positive number.

DETAILED DESCRIPTION

For the purposes of this specification, the term "calendrical time" is defined as the time as denominated in one or more measures (e.g., seconds, minutes, hours, time of day, day, day of week, month, month of year, year, etc.).

Figure 1:
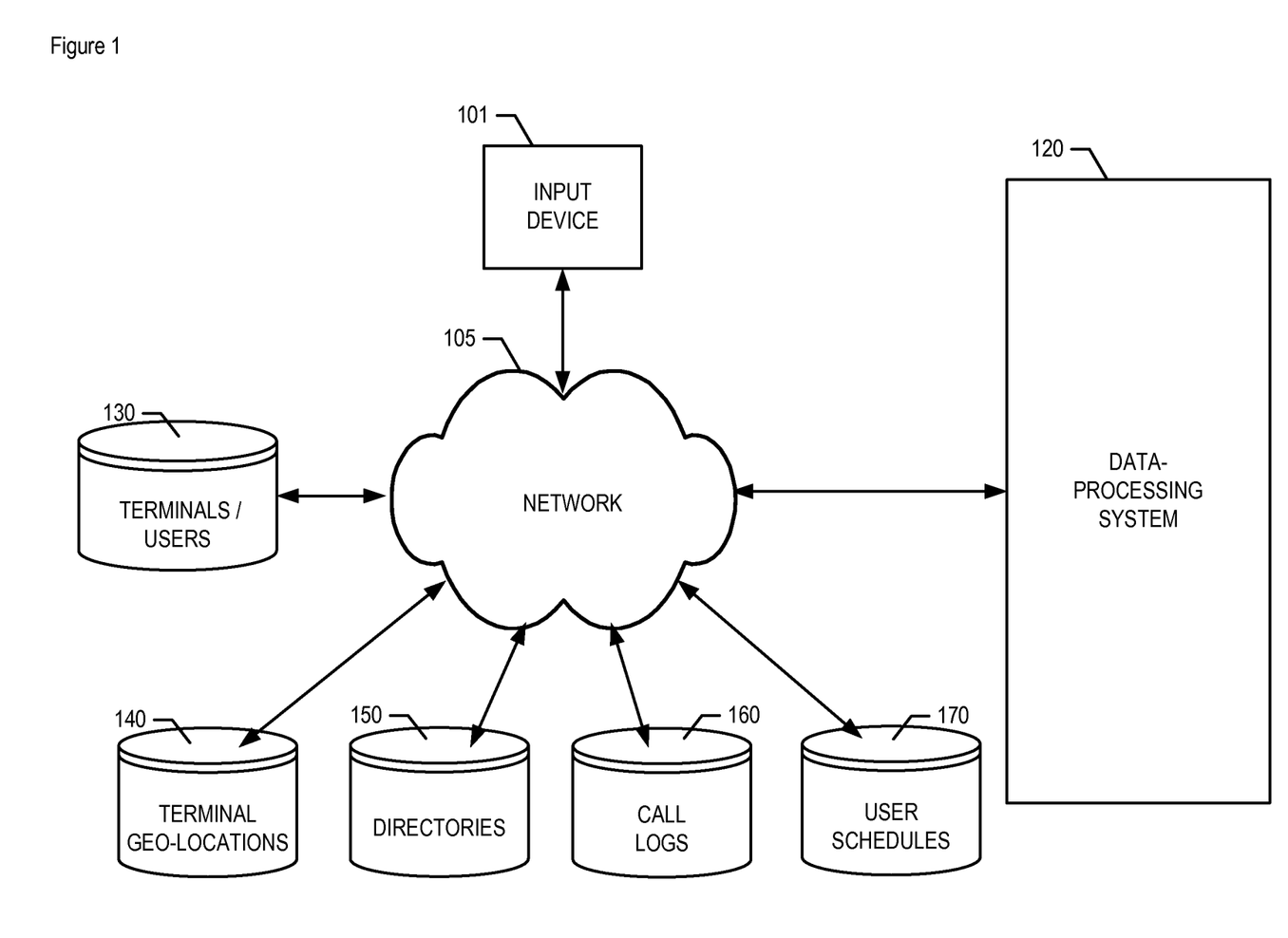
FIG. 1 depicts a schematic diagram of the salient elements of the first illustrative embodiment of the present invention.

For the purposes of this specification, the term "peer" is defined as a user, and FIG. 1 depicts a schematic diagram of the salient elements of the first illustrative embodiment of the present invention. As shown in FIG. 1, the first illustrative embodiment comprises input device 101, network 105, data-processing system 120, terminal/user mapping store 130, terminal geo-location store 140, directories store 150, call log store 160, and user schedule store 170, interconnected as shown. In accordance with the first illustrative embodiment, the elements depicted in FIG. 1 are owned and managed by a particular enterprise (e.g., a corporation, a non-profit hospital, etc.); however, in some other embodiments of the present invention this might not necessarily be the case.

Input device 101 (e.g., a numeric keypad, a magnetic card reader, etc.) is capable of receiving input from a user and of transmitting and receiving signals to and from network 105, in well-known fashion. In accordance with the first illustrative embodiment, input device 101 controls access to an electronically-locked door, not shown in FIG. 1.

Network 105 is capable of transporting signals to and from data-processing systems, input devices, output devices, etc. in well-known fashion. In accordance with the first illustrative embodiment network 105 is a local-area network (LAN); however, as will be appreciated by those skilled in the art, in some other embodiments of the present invention network 105 might be some other type of network, such as a metropolitan area network (MAN), a wide-area network (WAN), etc.

Data-processing system 120 is capable of receiving signals from network 105, of transmitting signals to network 105, of storing data and programs, and of executing programs, in well-known fashion. Data-processing system 120 is described in more detail below and with respect to FIG. 2.

Terminal/user mapping store 130 is a memory (e.g., disk drive, random access memory, flash memory, etc.) that associates each of a plurality of wireless telecommunications terminals with a user to whom the terminal is registered (i.e., the owner of the terminal).

Terminal geo-location store 140 is a memory that stores the current geo-locations of one or more wireless terminals belonging to members of the enterprise (e.g., employees, contractors, members of the Board of Directors, etc.), in well-known fashion. As will be appreciated by those skilled in the art, in some embodiments of the present invention, terminal geo-location store 140 might store current geo-locations for only a subset of enterprise members (e.g., only those members who are in the same building as input device 101, etc.), while in some other embodiments, terminal geo-location store 140 might store the current geo-locations for every member of the enterprise.

Directories store 150 is a memory that stores the contents of one or more directories (e.g., a staff telephone directory, a hierarchical organizational chart/directory, etc.). In accordance with the illustrative embodiments, directories store 150 contains employee information including office telephone number, cell phone number, building and office number, department, email address, instant messaging (IM) chat name, and so forth, as well as employee relationships (e.g., boss/subordinate, etc.) and organizational information (e.g., department hierarchies, department supervisors, etc.)

Call log store 160 is a memory that stores one or more call logs for telephone calls to and from members of the enterprise. In accordance with the illustrative embodiments, call log store 160 records information including the starting time and duration of a telephone call, the parties involved in a call, an indication of whether a call was answered, an indication of whether a voice mail message was left, and so forth, as is typical in the art.

As in terminal geo-location store 140, in some embodiments of the present invention call log store 160 might record call information for only a subset of enterprise members, while in some other embodiments call log store 160 might store this information for every member of the enterprise. Furthermore, in some embodiments of the present invention, call log store 160 might also record information for other kinds of communication, such as emails, instant messages (IM), etc.

User schedule store 170 is a memory that stores schedule information (e.g., meetings, vacations, etc.) for members of the enterprise.

Figure 2:
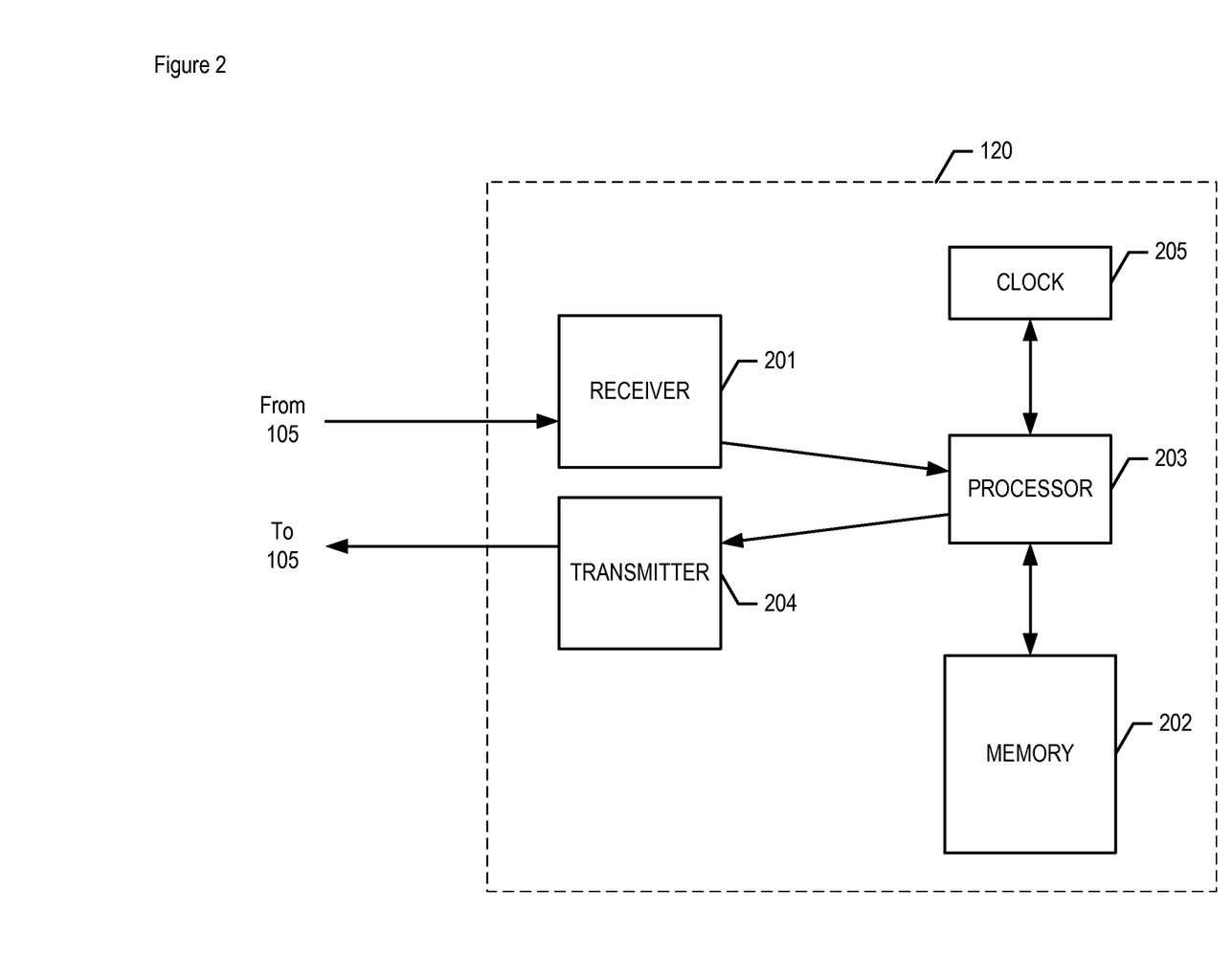
FIG. 2 depicts a schematic diagram of the salient elements of data-processing system 120, as shown in FIG. 1, in accordance with the first illustrative embodiment of the present invention.

FIG. 2 depicts a schematic diagram of the salient elements of data-processing system 120, in accordance with the first illustrative embodiment of the present invention. As shown in FIG. 2, data-processing system 120 comprises receiver 201, processor 202, memory 203, and transmitter 204, interconnected as shown.

Receiver 201 is capable of receiving signals from network 105, and of forwarding information encoded in these signals to processor 202, in well-known fashion. It will be clear to those skilled in the art, after reading this disclosure, how to make and use receiver 201.

Processor 202 is a general-purpose processor that is capable of reading data from and writing data into memory 203, and of executing the tasks described below and with respect to FIG. 3. As will be appreciated by those skilled in the art, in some embodiments of the present invention processor 202 might be a special-purpose processor rather than a general-purpose processor. In either case, it will be clear to those skilled in the art, after reading this disclosure, how to make and use processor 202.

Memory 203 is capable of storing data and executable instructions, as is well-known in the art, and might be any combination of random-access memory (RAM), flash memory, disk drive, etc. It will be clear to those skilled in the art, after reading this disclosure, how to make and use memory 203.

Transmitter 204 is capable of receiving information from processor 202 and transmitting signals that encode this information to network 105, in well-known fashion. It will be clear to those skilled in the art, after reading this disclosure, how to make and use transmitter 204.

Clock 205 transmits the current time, date, and day of the week to processor 202, in well-known fashion.

Figure 3:
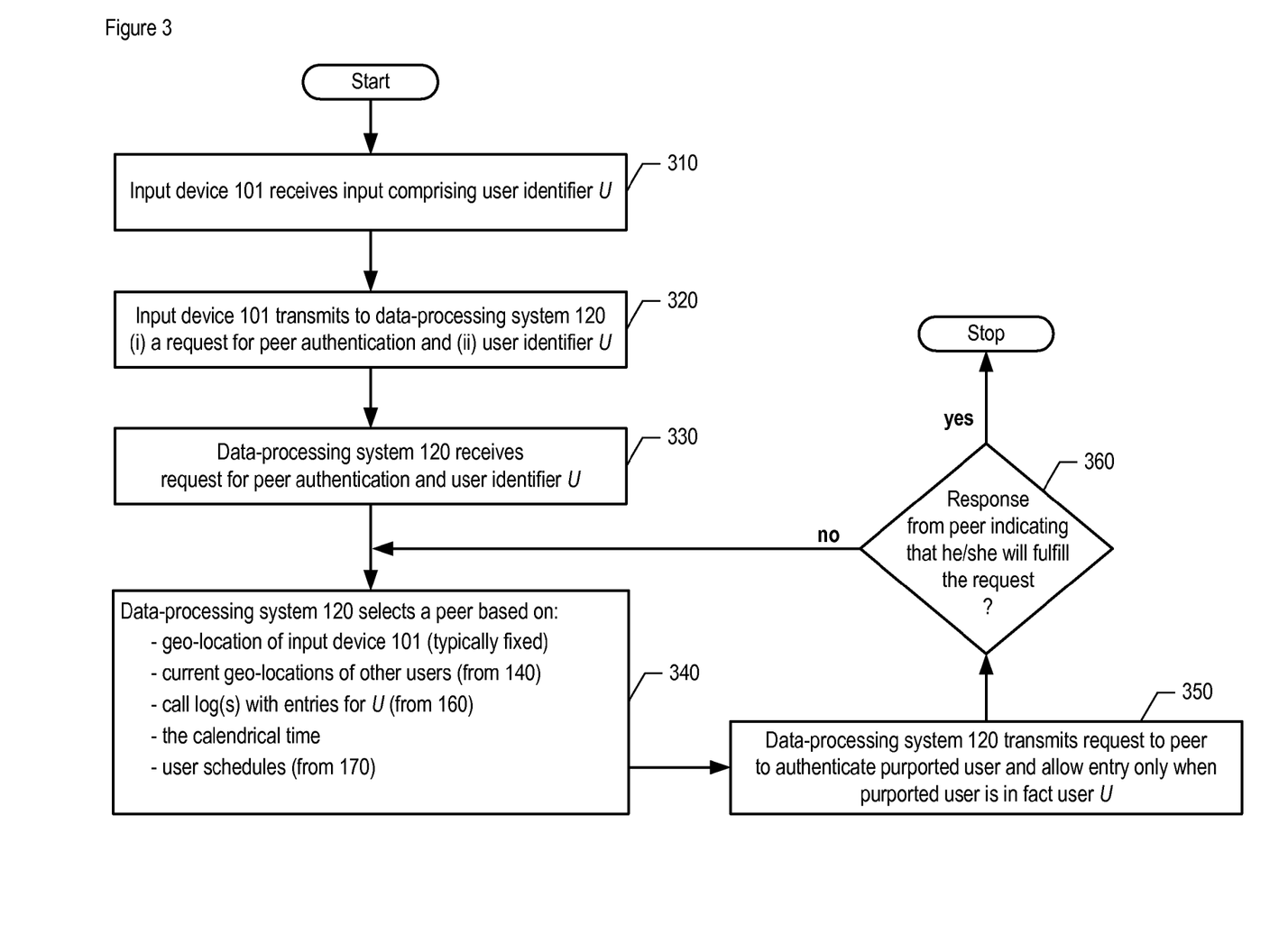
FIG. 3 depicts a flowchart of the salient tasks of input device 101 and data-processing system 120, as shown in FIG. 1, in accordance with the first illustrative embodiment of the present invention.

FIG. 3 depicts a flowchart of the salient tasks of input device 101 and data-processing system 120, in accordance with the first illustrative embodiment of the present invention. It will be clear to those skilled in the art, after reading this disclosure, which tasks depicted in FIG. 3 can be performed simultaneously or in a different order than that depicted.

At task 310, input device 101 receives an input comprising a user identifier U (e.g., an employee number, etc.), in well-known fashion (e.g., via keypad input, via the swiping of a magnetic card, etc.).

At task 320, input device 101 transmits to data-processing system 120, via network 105:
  (i) a request that the individual at input device 101 be peer authenticated, and
  (ii) user identifier U.

At task 330, data-processing system 120 receives the peer authentication request and user identifier U via network 105, in well-known fashion.

At task 340, data-processing system 120 selects an authentication peer for "purported" user U based on:
  the geo-location of input device 101 (which is typically fixed, as in the illustrative embodiment);
  the current geo-locations of other terminals (and inferentially, their users), which can be obtained from store 140;
  employee and organizational information, which can be obtained from directories store 150;
  call log entries for user U, which can be obtained from store 160;
  the calendrical time, provided by clock 205;
  user schedules, which can be obtained from store 170; and
  the terminal/user mappings of store 130, which enable
    data-processing system 120 to navigate among stores 140, 150, 160, and 170 as necessary (i.e., when the entries of one store—say user schedule store 170—specify user identifier while the entries of another store—say terminal geo-location store 160—specify a terminal identifier).

As will be appreciated by those skilled in the art, the exact criteria and methods by which data-processing system 120 selects an authentication peer can vary from implementation to implementation, based on the desires of the enterprise's security department, its management, and so forth. A number of possible strategies that were disclosed above include: selecting the peer that is closest to input device 101; selecting the peer who knows user U the best, as inferred from call log store 160; selecting the closest peer to input device 101 who is not currently in a meeting, as indicated by user schedule store 170. It will be clear to those skilled in the art, after reading this disclosure, how to make and use embodiments of the present invention that implement these strategies, as well as embodiments that implement alternative strategies based on the criteria above.

At task 350, data-processing system 120 transmits a message to the selected peer, requesting that the peer: (i) authenticate the purported user, and (ii) allow the purported user to enter through the electronically-locked door only when the purported user is in fact user U. As described above, in some embodiments the peer might perform the authentication in person and allow the user to enter by physically unlocking the door, while in some other embodiments, the peer might perform the authentication remotely (e.g., via an intercom, a video camera, etc.) and allow the user to enter by transmitting a signal that causes the electronic lock to be momentarily disabled. Moreover, in some embodiments of the present invention the transmitted message might provide one or more suggestions or guidance to the peer for authenticating the purported user (e.g., "talk about the last time you shared a meal together", etc.).

At task 360, data-processing system 120 checks whether the selected peer has responded with an acknowledgement that he or she will fulfill the request. If no such response has been received within a particular timeout period (e.g., 30 seconds, etc.), execution continues back at task 340 for selection of another peer. (Presumably, the selected peer was not available, or had his or her terminal powered down, etc.) Similarly, if a response is received indicating that the peer is unable to fulfill the request or has refused the request, execution continues back at task 340 for selection of another peer. Otherwise, if a response is received indicating that the selected peer has agreed to fulfill the request, the method of FIG. 3 terminates.

Figure 4:
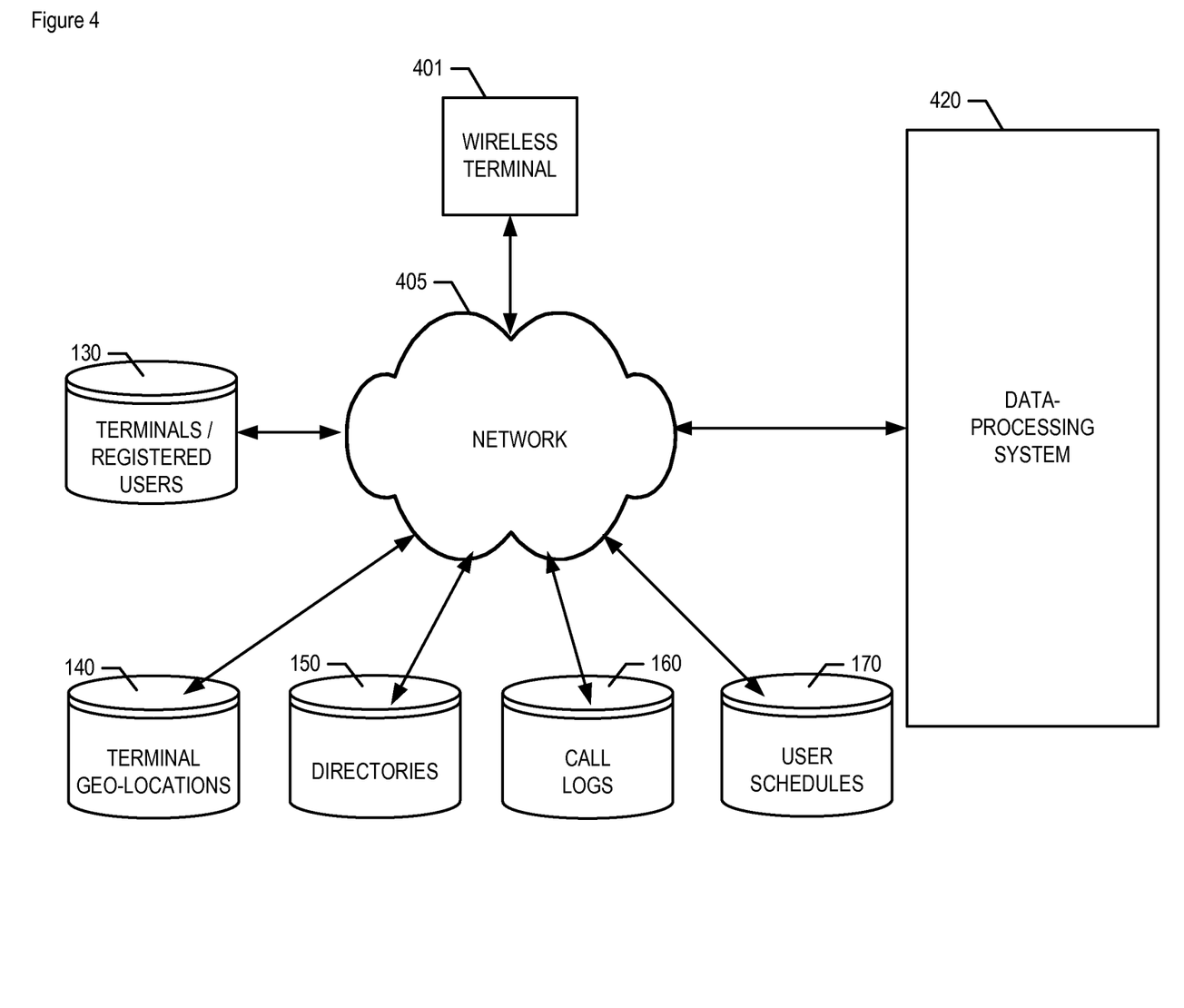
FIG. 4 depicts a schematic diagram of the salient elements of the second illustrative embodiment of the present invention.

FIG. 4 depicts a schematic diagram of the salient elements of the second illustrative embodiment of the present invention. As shown in FIG. 4, the second illustrative embodiment comprises network 405, wireless telecommunications terminal 401, data-processing system 420, terminal/user mapping store 130, terminal geo-location store 140, directories store 150, call log store 160, and user schedule store 170, interconnected as shown.

Network 405 is capable of receiving signals from and transmitting signals to one or more telecommunications terminals (e.g., wireless telecommunications terminal 401, etc.) in accordance with a wireless communication protocol (e.g., an Institute of Electrical and Electronics Engineers [IEEE] 802.11 protocol, etc.), and of receiving signals from and transmitting signals to data-processing system 420, terminal/user mapping store 130, terminal geo-location store 140, directories store 150, call log store 160, and user schedule store 170, in either wired or wireless fashion.

Wireless telecommunications terminal 401 is capable of transmitting and receiving signals wirelessly via network 405 (and perhaps via another wireless network, such as a CDMA network), and is registered to a user identified by a symbolic string U (e.g., a social security number, an employee number, an office telephone number, etc.). Wireless telecommunications terminal 401 is also capable of denying access to at least some of the terminal's functionality (e.g., making a phone call, reading an incoming email message, running a particular Web-based application, etc.) unless a signal has been received indicating that the terminal's current user has been authenticated as the registered user.

Figure 5:
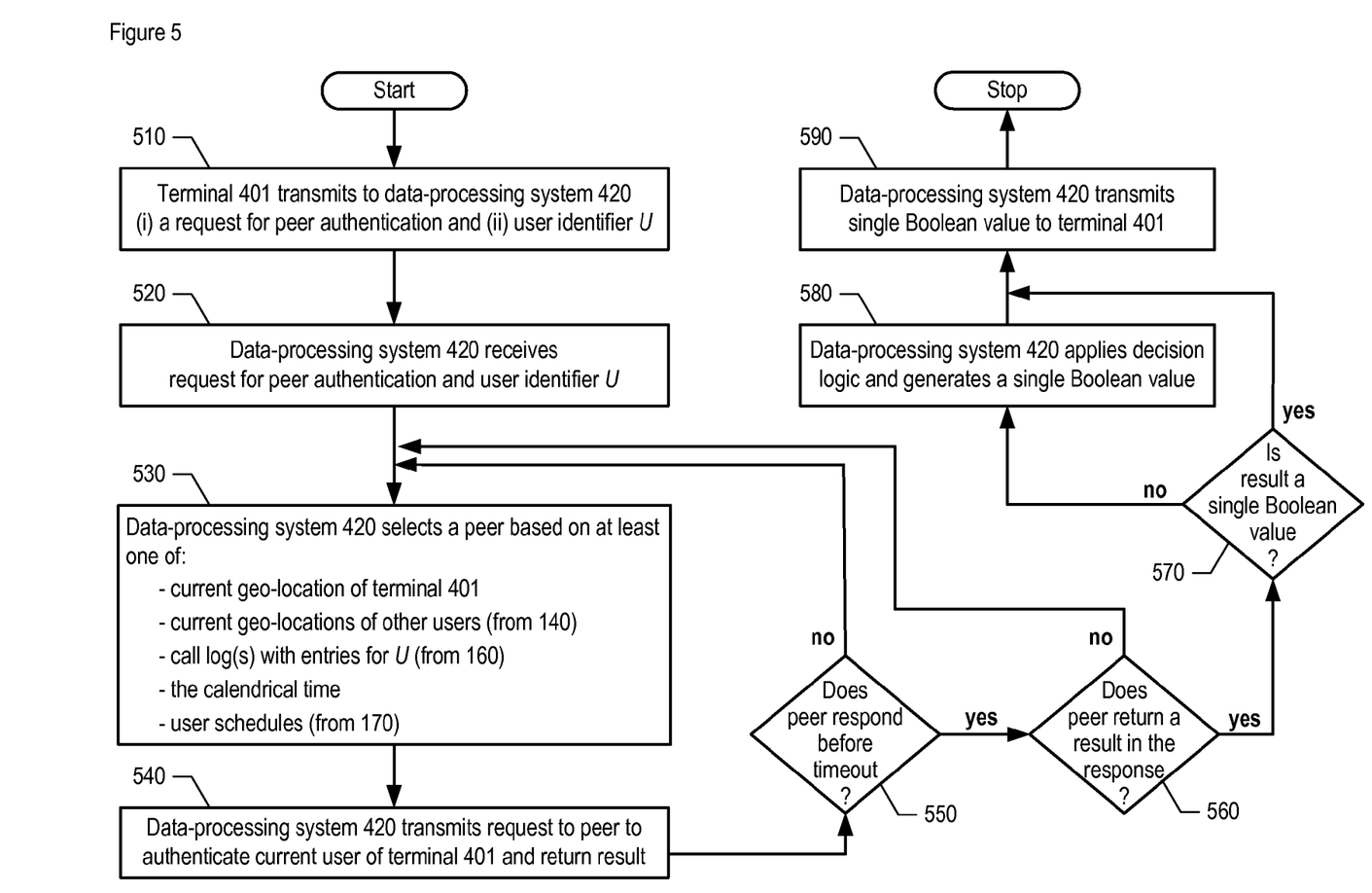
FIG. 5 depicts a flowchart of the salient tasks of wireless telecommunications terminal 401 and data-processing system 420, as shown in FIG. 4, in accordance with the second illustrative embodiment of the present invention.

Data-processing system 420 is similar to data-processing system 120, with the exception that it has been programmed to execute the pertinent tasks of the method of FIG. 5, rather than the method of FIG. 3.

Terminal/user mapping store 130, terminal geo-location store 140, directories store 150, call log store 160, and user schedule store 170 are the same as in the first illustrative embodiment.

FIG. 5 depicts a flowchart of the salient tasks of wireless telecommunications terminal 401 and data-processing system 420, in accordance with the second illustrative embodiment of the present invention.

At task 510, wireless telecommunications terminal 401 transmits to data-processing system 120, via network 405:
  (i) a request that its current user be peer authenticated, and
  (ii) a user identifier U that identifies the user to whom terminal 401 is registered.

As will be appreciated by those skilled in the art, in some embodiments wireless telecommunications terminal 401 might transmit an identifier that identifies the terminal, rather than the registered user—in which case data-processing system 420 can determine the registered user by querying terminal/user mapping store 130.

At task 520, data-processing system 420 receives the peer authentication request and user identifier U via network 405, in well-known fashion.

At task 530, data-processing system 420 selects an authentication peer for "purported" user U based on:
  the geo-location of wireless telecommunications terminal device 401 (which can be obtained from store 140, or in some embodiments might be transmitted by terminal 401 at task 520);
  the current geo-locations of other terminals (and inferentially, their users), which can be obtained from store 140;
  employee and organizational information, which can be obtained from directories store 150;
  call log entries for user U, which can be obtained from store 160;
  the calendrical time;
  user schedules, which can be obtained from store 170; and
  the terminal/user mappings of store 130, which enable data-processing system 420 to navigate among stores 140, 150, 160, and 170 as necessary.

As will be appreciated by those skilled in the art, the exact criteria and methods by which data-processing system 420 selects an authentication peer can vary from implementation to implementation, based on the desires of the enterprise's security department, its management, and so forth. As previously described, a number of possible strategies include: selecting the peer that is physically closest to wireless telecommunications terminal 401; selecting the peer who knows user U the best, as inferred from call log store 160; selecting the physically-closest peer to terminal 401 who is not currently in a meeting, as indicated by user schedule store 170; and selecting user U's boss as the authentication peer. It will be clear to those skilled in the art, after reading this disclosure, how to make and use embodiments of the present invention that implement these strategies, as well as embodiments that implement alternative strategies based on the above criteria.

At task 540, data-processing system 420 transmits a message to the selected peer, requesting that the peer: (i) authenticate the current user of terminal 401 (i.e., determine whether the current user is user U), and (ii) return the result of the authentication (i.e., transmit the result back to data-processing system 420). As described above, in some embodiments of the present invention, the peer might perform the authentication in person, while in some other embodiments, the peer might perform the authentication remotely (e.g., calling terminal 401 and speaking to its current user, etc.).

Furthermore, in some embodiments of the present invention, the peer might return a result that indicates whether or not the peer has authenticated the current user as user U, while in some other embodiments, the peer might return a result that simply characterizes the current user's responses to a series of questions (e.g., what percentage of questions the current user answered correctly, etc.)—thereby leaving data-processing system 420 with the task of determining whether to authenticate the current user as user U (e.g., applying a threshold of, say, 75% correct answers; etc.).

Still further, in some embodiments of the present invention, the result might be a single Boolean value indicating the peer's authentication decision, or a plurality of Boolean values indicating correct/incorrect for each of a series of questions, while in some other embodiments, the result might be a value that indicates the peer's degree of confidence in whether the current user is in fact user U, such as a real number in interval $[0,1]$, or a value corresponding to one of: {absolutely yes [4], very sure [3], pretty sure [2], maybe so [1], don't know [0], maybe not [−1], pretty sure not [−2], very sure not [−3], absolutely no [−4]}. In still other embodiments, the result might be a plurality of values that indicate a "degree of correctness" for each of a series of questions.

As described above, in embodiments where the peer simply reports the results of the current user's responses to a series of questions, it is data-processing system 420 that makes the authentication decision in accordance with some decision logic with which it has been programmed. For example, a peer might return a result comprising degrees of confidence for a series of questions, and data-processing system 420 might apply a threshold to the average of the degrees of confidence (e.g., a threshold of 0.8 when the degrees of confidence are in interval $[0,1]$, etc.)

As will be appreciated by those skilled in the art, some embodiments of the present invention might employ some combination of the alternatives disclosed above, or might employ some other variations (e.g., using an enumerated data type instead of a real number to specify degrees of confidence or correctness, etc.), and it will be clear to those skilled in the art, after reading this disclosure, how to make and use such embodiments.

At task 550, a branch is executed based on whether or not data-processing system 420 receives a response from the selected peer before a timeout period expires. If not, execution continues back at task 530, otherwise execution proceeds to task 560.

At task 560, a branch is executed based on whether or not the selected peer has returned a result in the response. If not (e.g., the response is a refusal to fulfill the request, etc.), execution continues back at task 530, otherwise execution proceeds to task 570.

At task 570, a branch is executed based on whether or not the returned result is a single Boolean value. If not (e.g., the result is a plurality of Boolean values, the result is a real number, the result is a plurality of real numbers, etc.), execution proceeds to task 570, otherwise execution continues at task 580.

At task 580, data-processing system 420 applies its decision logic to the returned result and generates a single Boolean value.

At task 590, data-processing system 420 transmits the single Boolean value to terminal 401, thereby indicating to terminal 401 whether the current user should be allowed to perform any functions that require authentication. After task 590, the method of FIG. 5 terminates.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus comprising:
   a receiver for receiving a signal that indicates that a user is to be authenticated; and
   a processor for selecting a peer that is capable of authenticating said user in person;
   wherein the selection of said peer is based on one or more properties of one or more entities and a schedule for one or more users; and
   wherein at least one of said properties is expected to change during any time interval of N minutes, wherein N is no more than 10080;
   and wherein N is a positive number.

2. The apparatus of claim 1 wherein N is no more than 60.

3. The apparatus of claim 1 wherein N is no more than 1440.

4. The apparatus of claim 1 wherein the selection of said peer is based on the current geo-location of said user.

5. The apparatus of claim 4 wherein the selection of said peer is also based on the current geo-location of said peer.

6. The apparatus of claim 1 wherein the selection of said peer is based on the current geo-location of said peer.

7. The apparatus of claim 1 wherein the selection of said peer is based on the contents of a call log.

8. A method comprising selecting a peer to authenticate a user, wherein:
   the peer is capable of authenticating the user in person;
   the selection of said peer is based on one or more properties of one or more entities and a schedule for one or more users; and
   at least one of said properties is expected to change during any time interval of N minutes, and wherein N is a positive number that is no more than 10080.

9. The method of claim 8 wherein N is no more than 60.

10. The method of claim 8 wherein N is no more than 1440.

11. The method of claim 8 wherein the selection of said peer is based on the current geo-location of said user.

12. The method of claim 8 wherein the selection of said peer is based on the contents of a call log.

13. The method of claim 12 wherein the selection of said peer is based on the time of the most recent call between said user and said peer.

14. The method of claim 12 wherein the selection of said peer is based on the number of calls between said user and said peer in a time interval.

15. The method of claim 12 wherein the selection of said peer is based on the duration of a call between said user and said peer.

16. The method of claim 8 wherein the selection of said peer is based on a hierarchical organization chart.

17. A method comprising:
   transmitting to a human peer a signal that indicates that a user is to be authenticated by said human peer, wherein the selection of said human peer is based on one or more properties of one or more entities and a schedule for one or more users, wherein at least one of said properties is expected to change during any time interval of N minutes, and wherein N is a positive number that is no more than 10080;
   receiving from said human peer, in response to said signal, a non-Boolean value; and
   determining whether to authenticate said user based in said non-Boolean values.

18. The method of claim 17 wherein said non-Boolean value is a degree of confidence specified by said human peer.

19. The method of claim 17 wherein said non-Boolean value is a degree of correctness for a response by said user to a question.

20. The method of claim 17 further comprising determining whether to lock out said user based on said non-Boolean value.

* * * * *

UNITED STATES PATENT AND TRADEMARK OFFICE
CERTIFICATE OF CORRECTION

PATENT NO.       : 8,646,039 B2                           Page 1 of 1
APPLICATION NO.  : 11/832574
DATED            : February 4, 2014
INVENTOR(S)      : Jon Louis Bentley et al.

It is certified that error appears in the above-identified patent and that said Letters Patent is hereby corrected as shown below:

Claims

Claim 17, Column 10, line 27, "based in" should read -- based on --.

Signed and Sealed this
Fourth Day of August, 2015

Michelle K. Lee
*Director of the United States Patent and Trademark Office*